United States Patent [19]

Yamanaka et al.

[11] Patent Number: 5,442,393
[45] Date of Patent: Aug. 15, 1995

[54] TELEVISION CAMERA HAVING A NOISE REDUCTION AND VERTICAL EDGE CORRECTION APPARATUS

[75] Inventors: Junichi Yamanaka, Sagamihara; Fumio Takahashi, Tokyo, both of Japan

[73] Assignee: Kabushiki Kaisha Toshiba, Kawasaki, Japan

[21] Appl. No.: 103,685

[22] Filed: Aug. 10, 1993

[30] Foreign Application Priority Data

Aug. 11, 1992 [JP] Japan .................................. 4-213129

[51] Int. Cl.$^6$ .............................................. H04M 3/14
[52] U.S. Cl. .................... 348/252; 348/241; 348/606
[58] Field of Search ............... 348/629, 625, 606, 252; 382/31, 54, 22

[56] References Cited

U.S. PATENT DOCUMENTS

| | | | |
|---|---|---|---|
| 4,574,309 | 3/1986 | Arisawa et al. | 348/252 |
| 5,040,071 | 8/1991 | Stevens | 358/213.26 |
| 5,177,600 | 1/1993 | Monta et al. | 348/606 |

FOREIGN PATENT DOCUMENTS

| | | |
|---|---|---|
| 58-165483 | 9/1983 | Japan . |
| 63-20980 | 1/1988 | Japan . |
| 2-31912 | 7/1990 | Japan . |
| 2-220574 | 9/1990 | Japan . |

*Primary Examiner*—Donald J. Yusko
*Assistant Examiner*—Michael H. Day
*Attorney, Agent, or Firm*—Oblon, Spivak, McClelland, Maier & Neustadt

[57] ABSTRACT

An interlacing television camera apparatus includes a solid-state imaging device, drive unit, delay unit, and vertical-edge correcting unit. The drive unit drives the imaging unit to simultaneously output, in a first field, a main video signal and a sub-video signal i.e., even and odd numbered lines, respectively, in a first field from the device, which represent a charge accumulated in a pixel located on a scanning line of the first field and a charge accumulated in a pixel located on a scanning line of a second field next to the first field, respectively. Next, the drive unit drives the imaging device to simultaneously output, in the second field, a main video signal and a sub-video signal in a second field from the device, which represent the charge accumulated in the pixel located on the scanning line of the second field and a charge accumulated in a pixel located on a scanning line of a first field next to the second field, respectively. The delay unit delays the first sub-video signal in the first field by one horizontal scanning period to produce a second sub-video signal, and delays the first sub-video signal in the second field by one horizontal scanning period to produce a second sub-video signal. The vertical-edge correcting unit processes the first sub-video signal and the second sub-video signal in each field and adds a result of the processing to the main video signal, to correct a vertical edge of the main video signal.

5 Claims, 6 Drawing Sheets

TELEVISION CAMERA HAVING A NOISE REDUCTION AND VERTICAL EDGE CORRECTION APPARATUS

BACKGROUND OF THE INVENTION

1. Field of the Invention

The present invention relates to a television camera apparatus which has a solid-state imaging device such as a CCD (Charge Coupled Device), and more particularly to a technique of improving vertical resolution.

2. Description of the Related Art

A brief discussion of interlace scanning will now be entertained. 2:1 interlace scanning is employed in the color television broadcasting of a NTSC system or a PAL system. Television cameras having a CCD (hereinafter called "CCD cameras") used in color television broadcasting adopt a so-called "reading of signals of two-pixel-summation" for both a first field and a second field. In reading signals using two-pixel-summation, signals are read from about 480 scanning lines (in the NTSC system) or from about 580 scanning lines (in the PAL system) in the available picture zone.

Furthermore, in reading signals of two-pixel-summation, the charges of two adjacent pixels in any row, which are incorporated in the CCD, are added together to form a signal. This signal, which is output from the CCD, is equivalent to the sum of two video signals generated from two adjacent scanning lines as in a so-called "reading of signals of two-line-summation." In a CCD camera, the combination of two pixels accumulating charges to be added is changed for each field to alter combination of two scanning lines. Thus interlace scanning is performed.

In reading signals of two-line-summation, an output of the CCD is a sum of the outputs generated from two adjacent scanning lines. Hence, this scheme enhances the sensitivity of the CCD camera. The reading of signals of two-line-summation, however, is disadvantageous in that each scanning line becomes equivalently thick. In addition, since two lines are read as one, the resulting scanning lines appear to be fewer and farther apart. As a result, the vertical resolution of the CCD camera is decreased.

How each scanning lines becomes equivalently thick will now be explained, with reference to FIGS. 1, 2, and 3.

Figure 1:
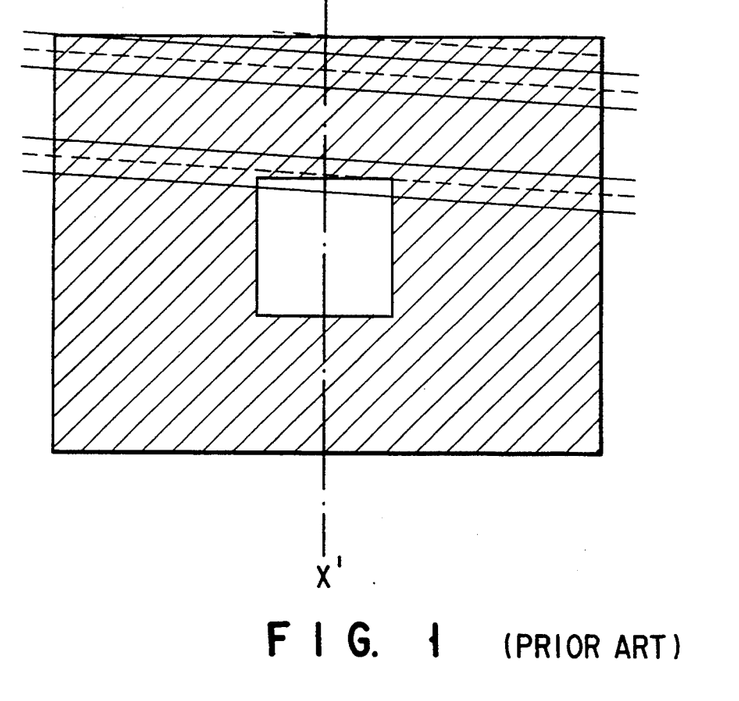
FIG. 1 is a diagram illustrating an object of photography, and explaining how the vertical resolution of an CCD camera is defined.

FIG. 1 shows an image which is an object of photography for the CCD camera. The image consists of a white square on a rectangular black background. It is assumed here that the background is not exactly black and therefore has some reflectivity. In FIG. 1, the solid lines indicate scanning lines for odd-numbered fields (hereinafter referred to as "first fields"), and the broken lines indicate scanning line for even-numbered fields (hereinafter referred to as "second fields"). (Generally, a solid line and a broken line are used to indicate a scanning for an odd-numbered field and an even-numbered field, respectively to explain interlace sanning.) The vertical dot-dash line X—X' traversing near the center of the image indicates a sampling position where the vertical resolution of the CCD camera is measured.

Figure 2:
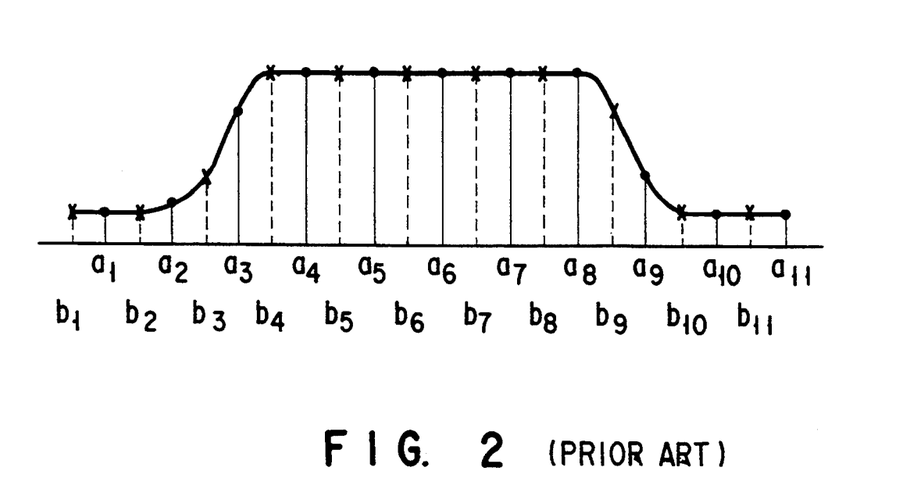
FIG. 2 is a diagram showing the level distribution of video signals sampled at the intersections of scanning lines and a line passing across the middle part of the image of the object.

FIG. 2 shows the levels of video signals sampled at the intersections (i.e., pixels) of the line X—X' and the scanning lines. More precisely, the levels of the signals are plotted on the ordinate and along the abscissa which is a time axis. Each vertical solid line represents a video signal for the first field, whereas each vertical broken line indicates a video signal for the second field. The letters "a" and "b" denote an odd-numbered scanning line and an even-numbered scanning line, respectively. The envelop passing through the peaks of the sampled video signals represents the distribution of signal levels along the line.

Figure 3A:
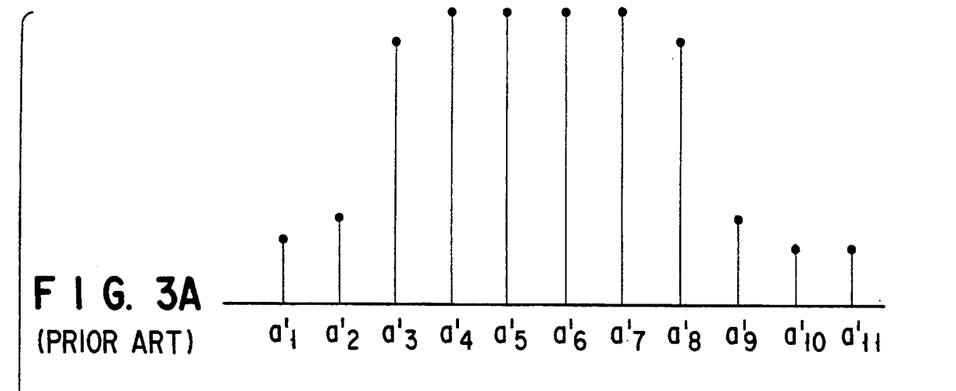
FIG. 3A is a diagram showing the level distribution of the signals a CCD outputs for a first field when it scans an object and is operated in reading signals of two-line-summation.
Figure 3B:
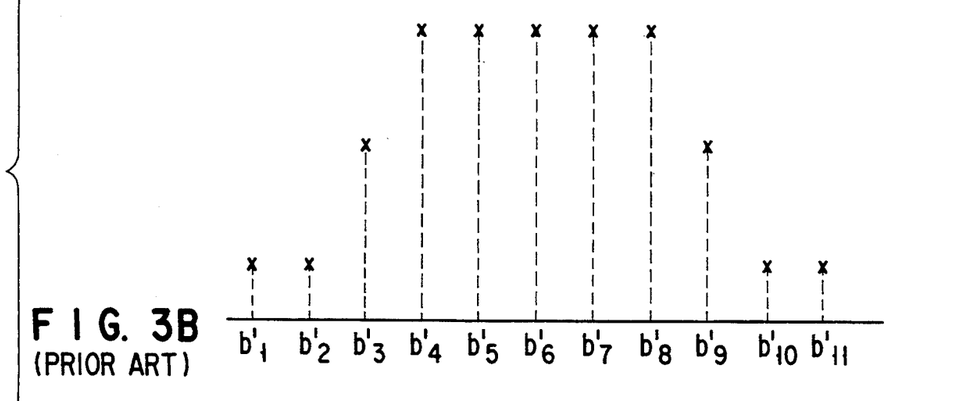
FIG. 3B is a diagram illustrating the level distribution of the signals, which the CCD outputs for a second field when it scans an object, and is operated in the reading of signals of two-line-summation.

When the CCD camera reading signals of two-line-summation scans the image shown in FIG. 1, the video signals sampled at the intersections of the line X—X' and the solid lines will define the first-field level distribution shown in FIG. 3A. Similarly, the video signals sampled at the intersections of the dot-dash line and the broken lines will define the second-field level distribution shown in FIG. 3B. All video signals sampled at the intersections of the line X—X' and the solid and broken lines will define the overall level distribution shown in FIG. 3C.

For the first fields, video signals $b_1, b_2, b_3, \ldots$ shown in FIG. 2 are added to video signals $a_1, a_2, a_3, \ldots$ shown in FIG. 2, respectively, thereby forming the video signals $a'_1, a'_2, a'_3, \ldots$ which are illustrated in FIG. 3A. For the second fields, video signals $a_1, a_2, a_3 \ldots$ shown in FIG. 2 are added to video signals $b_1, b_2, b_3 \ldots$ shown in FIG. 2, respectively, thereby forming the video signals $b'_1, b'_2, b'_3, \ldots$ which are illustrated in FIG. 3B. The signals $a'_1, a'_2, a'_3, \ldots$ and the signals $b'_1, b'_2, b'_3, \ldots$ are output from the CCD camera.

Figure 3C:
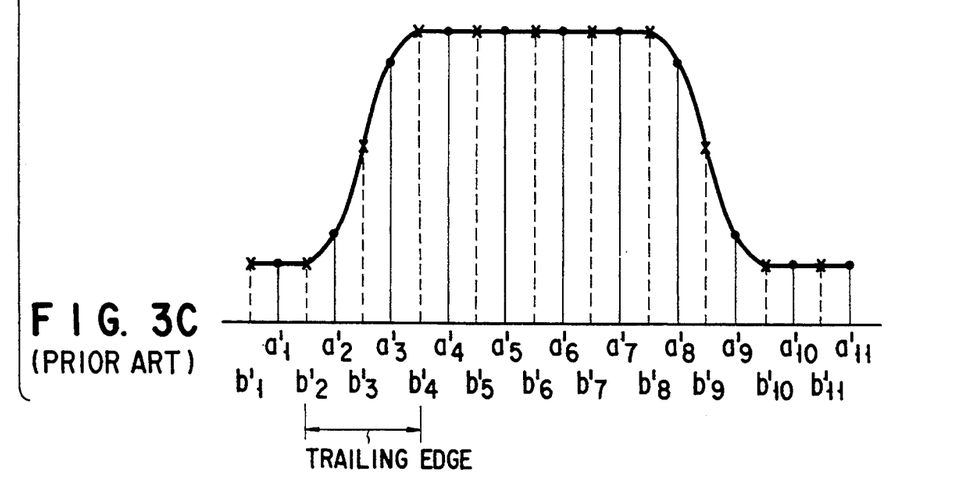
FIG. 3C is a diagram showing the level distribution of signals obtained by interlacing the output signals of the CCD operating in the reading of signals of two-line-summation.

When the output of the CCD camera is interlaced, the first-field level distribution and the second-field level distribution become interpolated as shown in FIG. 3C. The CCD camera output, thus processed, is supplied to a television receiver, and the CRT of the receiver displays a horizontal line in the level distribution defined by the envelope shown in FIG. 3C.

The leading edge of the envelope shown in FIG. 2 extends from the sampling points $b_2$ to $b_4$, whereas that of the envelope shown in FIG. 3C extends for a longer time, from the sampling points $b'_2$ to $b'_4$. This is because the reading of signals of two-line-summation is employed in the CCD camera. For the same reason, the trailing edge of the envelope of FIG. 3C extends for a longer time than that of the envelope of FIG. 2. The increase in the time over the leading and trailing edges of the envelope means a decrease in vertical resolution. Needless to say, this decrease in vertical resolution is the result from the application of reading of signals of two-line-summation.

In order to prevent such a decrease in vertical resolution, the CCD camera may adopt a technique of reading signals of one line in which video signals $a_n$ and $b_n$ are read in the first field and the second field, respectively. In this case, however, the charges in any two adjacent pixels are not added, and the sensitivity of the CCD camera is consequently reduced to 50%.

Jpn. Pat. Appln. KOKAI Publication No. 2-220574 (Title: "CCD Camera Apparatus") discloses a method of preventing a decrease in vertical resolution.

In the Kokai method, video signals generated from two adjacent horizontal lines are read from a CCD simultaneously but independently. In each odd-numbered field, the video signal produced from the odd-numbered line is used as a basic video signal, whereas the video signal generated from the even-numbered line is used as a first comparative video signal. The first comparative video signal is delayed for one horizontal-scanning period, producing a second comparative video signal. The second comparative video signal is compared with the next basic video signal. Similarly, in each even-numbered field, the video signal produced from the even-numbered line is used as a basic video signal, whereas the video signal generated from the odd-numbered line is used as a first comparative video signal. The first comparative video signal in the even-numbered field is also delayed by one horizontal-scanning period, producing a second comparative video signal, which is compared with the next basic video signal. In each field, both odd-numbered and even-numbered, the difference between the basic video signal and the first comparative video signal and the difference between the basic video signal and the second comparative video signal are obtained, forming two difference signals. The difference between the difference signals is then obtained and added as a vertical-edge signal to the basic video signal in each field to emphasize a vertical edge.

This method is basically that of the reading of signals of one line. Hence, the CCD camera has only about 50% of the sensitivity it can attain in adopting the reading of signals of two-line-summation.

In another technique, the CCD camera has the capability to process signals without having its sensitivity reduced, even if operated in reading signals of one line.

The charges in the pixels are read during field periods in the reading of signals of two-line-summation. In an NTSC system, the charges are read every 1/60 sec if the field periods are 1/60 sec. When this is the case, the charge-intergration period of the CCD is 1/60 sec. In reading signals of one line, it suffices to read a scanning line for odd-numbered fields (indicated by a solid line in FIG. 2) in the first field. No scanning line needs to be read in the second field which follows the first. Hence, the charge-intergration period of the CCD can be lengthened to 1/30 sec. (The period thus lengthened is generally known as "frame-integration period.")

Doubling of the charge-intergration period, however, gives rise to an afterimage when used for motion pictures. In fact, when the charge-integration period increases to the frame-integration period, afterimage occurs and the quality of moving pictures deteriorates.

A method of improving the vertical resolution of a CCD camera, without causing afterimage is disclosed in Jpn. Pat. Appln. KOKAI Publication No. 63-209280 (Title: "Method of Driving the Electronic Shutter of a Solid-State Imaging Apparatus"). In this method, the shutter of the CCD camera is driven such that the period for which two adjacent charge-integration elements located on an odd-numbered line accumulates charges and the period for which two adjacent charge-integration elements located on an even-numbered line accumulates charges are altered in every field. The vertical resolution of the CCD camera is thereby enhanced.

This method is, however, disadvantageous in the following respects since the CCD shutter is driven in a specific manner to improve the vertical resolution.
(1) The more the vertical resolution is improved, the lower the level of the signal output from the CCD.
(2) Ordinary shutter driving cannot be performed.
(3) Light and dark stripes cannot be prevented from appearing in the image which the CCD camera provides (i.e, a re-take image) by taking a TV-screen image displayed by a TV receiver synchronous with the camera. (It is known that no stripes will appear in a re-take image if the CCD shutter is not driven, whereas stripes will appear in the image if the CCD shutter is driven.)
(4) An image of an object illuminated with light from a 50 Hz fluorescent lamp light and photo graphed by the CCD camera cannot be free of flicker. This is because the shutter cannot be driven at the frequency of 100 Hz to eliminate the effect of the fluorescent-lamp light on the image.

A decrease in the level of the CCD output signal, i.e., the problem (1), accompanies the ordinary use of the CCD camera. A decrease in the signal level may reduce the sensitivity of the CCD camera, which is inversely proportional to the resolution.

The above-described method of improving the vertical resolution of a CCD camera can indeed shorten the time over the leading and trailing edges of the envelope shown in FIG. 3C. This method, however, cannot add a vertical-edge signal to a basic video signal.

In conventional cameras employing interlace-scanning, vertical-edge signals are generated and are used to achieve image-edge correction. Here resides a problem. The scanning line corresponding to each vertical-edge signal is substantially thick since the signal has been produced from three signals for the same field, i.e., a signal not delayed at all, a signal delayed by a horizontal-scanning period, and a signal delayed by two horizontal-scanning periods.

Jpn. Pat. Appln. KOKAI Publication No. 2-31912 (Title: "Apparatus for Generating Vertical-Edge Signals") discloses a method in which a field memory is used to process signals for producing a vertical-edge signal. The scanning line corresponding to this vertical-edge signals has a thickness which is half the thickness of the scanning line corresponding to a signal produced from those three signals described above. This method requires not only a field memory but also digital processing circuits. Furthermore, with this method it is necessary to obtain a difference between two signals delayed by a one-field period and another delay by a two-field period. It is also necessary to process afterimage signals generated from the over lapping portions of the images which are represented by those two signals.

SUMMARY OF THE INVENTION

The object of the present invention is to provide a television camera apparatus which has a solid-state imaging device, and wherein the imaging device operates in reading signals of two-line-summation enhanced vertical resolution without shutter driving, while maintaining its high sensitivity.

According to the present invention, there is provided an interlacing television camera apparatus having a solid-state imaging device, comprising: drive means for driving the solid-state imaging device to simultaneously output a main video signal corresponding to a first horizontal line, and a sub-video signal corresponding to a second, adjacent horizontal line, in a first field from the imaging device, the main video signal representing a charge accumulated in a pixel located on a scanning line of the first field and the first sub-video signal representing a charge accumulated in a pixel located on a scanning line of a second field next to the first field, and after the first field is output, to simultaneously output a main video signal and a sub-video signal in a second field from the imaging device, the main video signal being the charge accumulated in the pixel located on the scanning line of the second field and the first sub-video signal being a charge accumulated in a pixel located on a scanning line of a first field next to the second field; delay means for delaying the first sub-video signal in the first field by one horizontal scanning period, thereby to produce a second sub-video signal, and for delaying the first sub-video signal in the second field by one horizontal scanning period, thereby to produce a second sub-video signal; and vertical-edge correcting means for processing the first sub-video signal and the second sub-video signal in each field, thereby to generate a third sub-video signal, and for adding the third sub-video signal to correct a vertical edge of the main video signal.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will be described in detail, with reference to FIG. 4.

Figure 4:
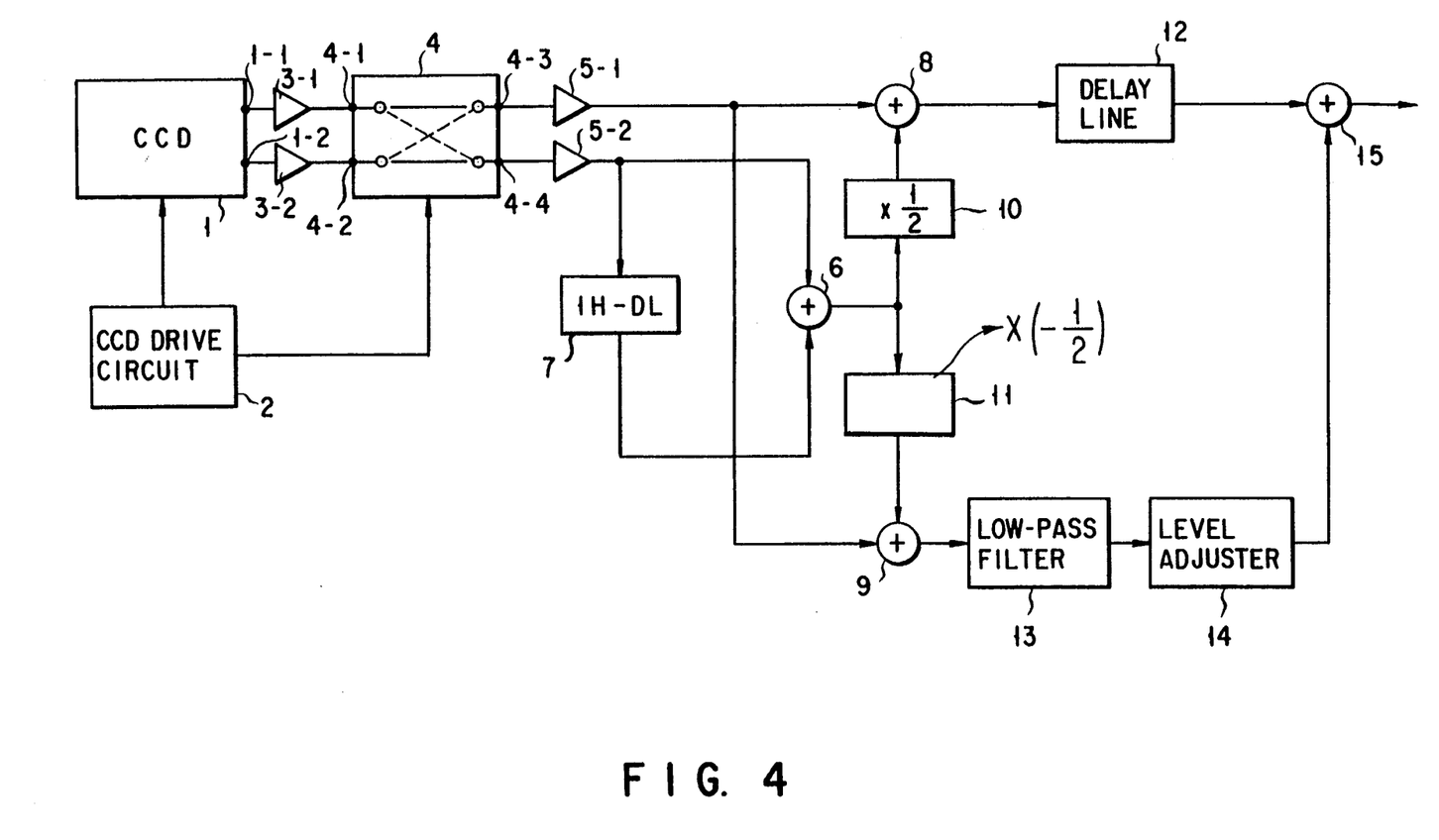
FIG. 4 is a block diagram showing a CCD camera which is an embodiment of the present invention.

FIG. 4 shows a CCD camera which is the embodiment of the present invention. As shown in FIG. 4, the camera has a CCD 1 which is a solid-state imaging device. The CCD 1 adopts reading of a signal of one line in each field and is driven by drive pulses supplied from a CCD drive circuit 2. The drive pulses are sync pulses for reading video signals from vertical and horizontal scanning lines, control pulses for driving the shutter of the CCD 1, and the like.

The CCD 1 has two video-signal output terminals 1—1 and 1-2. Two video signals corresponding to a scanning line of the first (odd-numbered) field and a scanning line of the second (even-numbered) field, respectively, are read from the terminals 1—1 and 1-2 at the same time or almost at the same time.

The video signals output from the terminals 1—1 and 1-2 of the CCD 1 are supplied to the first and second input terminals of a switching circuit 4 through buffer amplifiers 3-1 and 3-2, respectively. The switching circuit 4 switches the connection between its input terminals 4-1 and 4-2, on the one hand, and its output terminals 4-3 and 4-4, on the other, in accordance with a field ID signal which has been supplied from the CCD drive circuit 2 and which identifies either the first field or the second field. To be more precise, if the ID signal identifies the first field, the first input terminal 4-1 is connected to the first output terminal 4-3, and the second input terminal 4-2 to the second output terminal 4-4, as is indicated by solid lines in FIG. 4. Conversely, if the ID signal identifies the second field, the first input terminal 4-1 is connected to the second output terminal 4—4, and the second input terminal 4-2 to the first output terminal 4-3, as is indicated by broken lines in FIG. 4.

A video signal output from the second output terminal 4—4 of the switching circuit 4 is supplied via a buffer amplifier 5-2 to one of the two input terminals of a first adder 6, and is delayed by a one-horizontal scan period delay (1H-DL) circuit 7 and then supplied to the other input terminal of the first adder 6. Meanwhile, a video signal output from the first output terminal 4-3 of the switching circuit 4 is supplied via a buffer amplifier 5-1 to one of the two input terminals of a second adder 8 and also to one of the two input terminals of a third adder 9.

Each video signal added by the first adder 6 is divided into two video signals, which are input to a first coefficient circuit 10 and a second coefficient circuit 11, respectively. The circuit 10 multiplies the input video signal with a coefficient $+\frac{1}{2}$ and generates a signal, which is supplied to the other input terminal of the second adder 8. The circuit 11 multiplies the input video signal with a coefficient $-\frac{1}{2}$ and produces a signal, which is supplied to the other input terminal of the third adder 9.

A video signal produced by the second adder 8 is supplied, via a timing-adjusting delay line 12, to one of the two input terminals of a fourth adder 15. A video signal produced by the third adder 9 is supplied, via a low-pass filter 13 and a level adjuster 14, to one of the other input terminal of the fourth adder 15. The fourth adder 15 adds the two input signals, generating a video signal whose vertical edge has been corrected. This video signal is supplied to a next-stage circuit (not shown).

How the signals output by the CCD 1 are processed in the CCD camera shown in FIG. 4 will now be explained.

As indicated, the CCD 1 adopts a technique of reading a signal of one line in each field. Hence, the video signals that the CCD generates at the intersections of the dot-dash line (FIG. 1) and the scanning lines have the same level distribution as that one shown in FIG. 2, and do not contain signal components which correspond to the solid lines or the broken lines shown in FIG. 1. More specifically, in the first field, the signals $a_1$ and $b_2$, the signals $a_2$ and $b_3$, the signals $a_3$ and $b_4$ . . . . are read in the first field; the signals $a_1$, $a_2$, $a_3$ . . . . are sequentially output from the first output terminal 1—1, and the signals $b_2$, $b_3$, $b_4$, . . . are sequentially output through the second output terminal 1-2. In the second field, the signals $a_1$ and $b_1$, the signals $a_2$ and $b_2$, the signals $a_3$ and $b_3$, . . . are read in the first field; the signals $a_1$, $a_2$, $a_3$, . . . are sequentially output from the first output terminal 1—1, and the signals $b_1$, $b_2$, $b_3$, . . . are sequentially output through the second output terminal 1-2.

How the video signals generated in the first field are processed will be explained, with reference to FIGS. 5A to 5D.

Figure 5A:
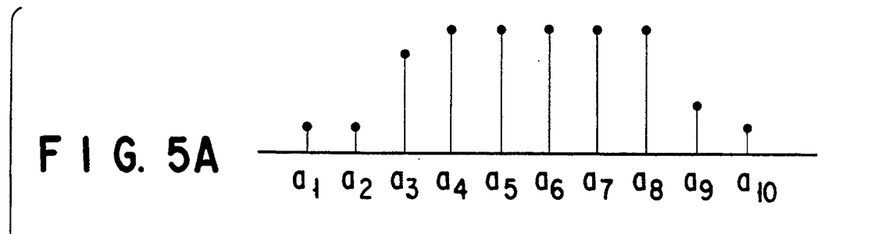
FIGS. 5A, 5B, and 5C are diagrams showing the level distributions of the signals the CCD incorporated in the CCD camera outputs for a first field when scanning the image of FIG. 1.
Figure 5B:
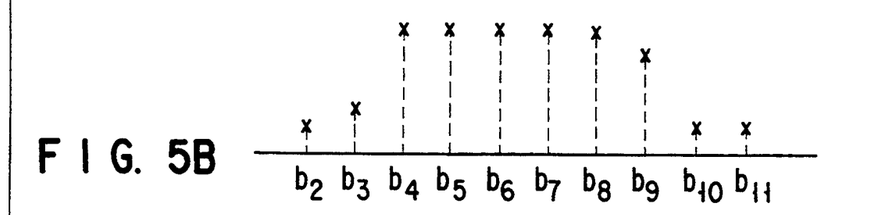

In the first field, video signals $a_1$, $a_2$, $a_3$, . . . are sequentially output from the output terminal 1—1 of the CCD 1 as illustrated in FIG. 5A, and video signals $b_2$, $b_3$, $b_4$, . . . are sequentially output from the output terminal 1-2 as illustrated in FIG. 5B.

At the time the signals $a_2$ and $b_3$, for example, are simultaneously generated in the first field, the input and output terminals of the switching circuit 4 are connected as indicated by the solid lines in FIG. 4. Therefore, the video signal $a_2$ output from the first output terminal 1—1 of the CCD 1 to the switching circuit 4 is supplied from the first output terminal 4-3 of the circuit 4, and the video signal $b_3$ output from the second output terminal 1-2 of the CCD 1 to the switching circuit 4 is supplied from the second output terminal 4—4 of the circuit 4.

The video signal $a_2$ output from the first output terminal 4-3 of the circuit 4 is supplied via the buffer amplifier 5-1 to the first input terminal of the second adder 8. The video signal $b_3$ output from the second output terminal 4—4 of the circuit 4 is supplied via the buffer amplifier 5-2 to the first input terminal of the first adder 6 and also to the 1H-DL circuit 7. The circuit 7 delays the signal $b_3$ by one horizontal scan period. The signal $b_3$ thus delayed is supplied to the second input terminal of the first adder 6.

At the time the pair of signals $a_2$ and $b_3$ for the first field are output from buffer amplifiers 5-1 and 5-2, respectively, the 1H-DL circuit 7 outputs the video signal $b_2$ which precedes the video signal $b_3$ by one horizontal scan period. Hence, at the same time, the first adder 6 performs the addition of $(b_2+b_3)$. The output of the adder 6, i.e. the sum $(b_2+b_3)$, input to the coefficient circuit 10. The circuit 10 multiplies the input signal with a coefficient $+\frac{1}{2}$ and generates a signal. This signal is supplied to the second input terminal of the second adder 8. Since the output of the buffer amplifier 5-1 is the signal $a_2$, the signal $a'_2$ (hereinafter called "proper line video signal") output by the second adder 8 is given as:

$$a'_2 = a_2 + 0.5 \times (b_2 + b_3)$$

Generally, a proper line video signal is expressed as follows:

$$a'_n = a_n + 0.5 \times (b_n + b_{n+1})$$

Figure 5C:
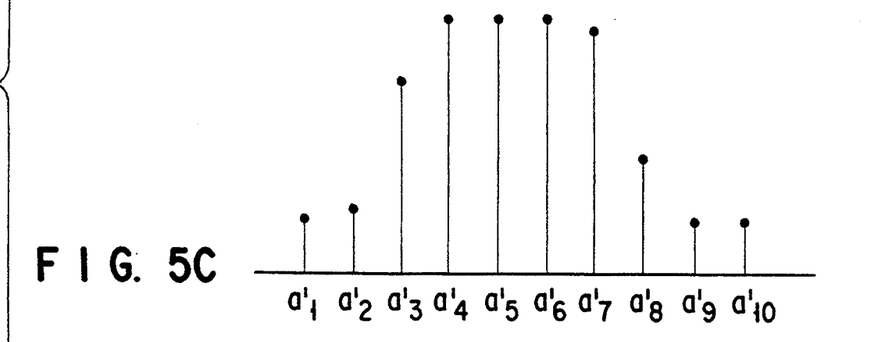

The proper line video signal therefore has, for the first field, the level distribution illustrated in FIG. 5C.

In the meantime, the output of the buffer amplifier 5-1, the video signal $a_2$ in this instance, is supplied to the first input terminal of the third adder 9. The output signal from the first adder 6, i.e., video signal $(b_2+b_3)$, is input to the coefficient circuit 11. The circuit 11 multiplies the input video signal with a coefficient $-\frac{1}{2}$ and produces a signal. This signal is supplied to the second input terminal of the third adder 9. The third adder 9 performs the following addition:

$$a''_2 = a_2 - 0.5 \times (b_2 + b_3)$$

This can be changed to a general equation of:

$$a''_n = a_n - 0.5 \times (b_n + b_{n+1})$$

Figure 5D:
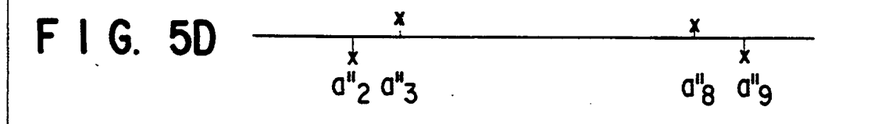
FIGS. 5D and 5E are diagrams illustrating the vertical-edge signals produced by processing the signals by the CCD.

The signal output by the third adder 9 therefore has the level distribution shown in FIG. 5D. This signal is a vertical-edge signal for first field. As can be understood from FIGS. 2, 5A, 5B, and 5C, the vertical-edge signal has been generated from the signals $b_2$ and $b_3$ sampled at two points which are on two second-field scanning lines and which are adjacent to that point on the first-field scanning line at which the signal $a_2$ has been sampled.

How the video signals generated in the second field are processed will be explained, with reference to FIGS. 6A to 6D.

Figure 6A:
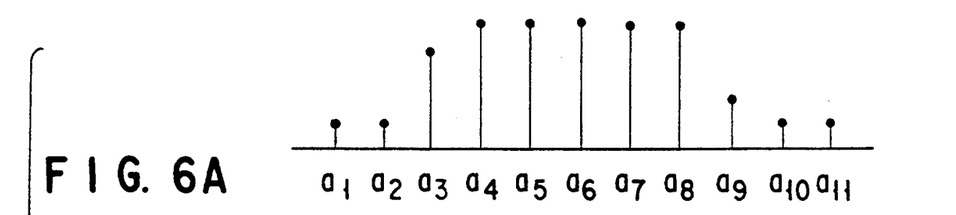
FIGS. 6A, 6B, and 6C are diagrams showing the level distributions of the signals the CCD incorporated in the CCD camera outputs for a second field when scanning the image of FIG. 1.
Figure 6B:
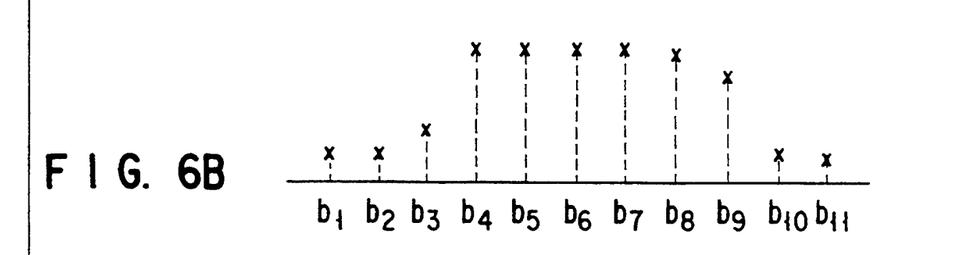

In the second field, video signal output are out put from the CCD 1 in a sequence different from the sequence in which they are output in the first field. To be more specific, video signals $a_1$, $a_2$, $a_3$, . . . are sequentially output from the output terminal 1—1 of the CCD 1 as illustrated in FIG. 6A, while video signals $b_1$, $b_2$, $b_3$ . . . . are sequentially output from the output terminal 1-2 as illustrated in FIG. 6B.

At the time the signals $a_3$ and $b_3$, for example, are simultaneously generated in the second field, the input and output terminals of the switching circuit 4 are connected as indicated by the broken lines in FIG. 4. Therefore, the video signal $a_3$ is output from the first output terminal 1—1 of the CCD 1 to the switching circuit 4 is supplied from the second output terminal 4-2 of the circuit 4, and the video signal $b_3$ output from the second output terminal 1-2 of the CCD 1 to the switching circuit 4 is supplied from the first output terminal 4-3 of the circuit 4.

The video signal $b_3$ output from the first output terminal 4-3 of the circuit 4 is supplied via the buffer amplifier 5-1 to the first input terminal of the second adder 8. The video signal $a_3$ output from the second output terminal 4—4 of the circuit 4 is supplied via the buffer amplifier 5-2 to the first input terminal of the first adder 6 and also to the 1H-DL circuit 7. The circuit 7 delays the signal $a_3$ by one horizontal scan period. The signal $a_3$ thus delayed is supplied to the second input terminal of the first adder 6.

At the time the pair of signals $b_3$ and $a_3$ for the first field are output from buffer amplifiers 5-1 and 5-2, respectively, the 1H-DL circuit 7 outputs the video signal $a_2$ which precedes the video signal $a_3$ by one horizontal scan period. Hence, at the same time, the first adder 6 performs the addition of $(a_3+a_2)$. The output of the adder 6, i.e. the sum $(a_3+a_2)$, input to the coefficient circuit 10. The circuit 10 multiplies the input signal with a coefficient $+\frac{1}{2}$ and generates a signal. This signal is supplied to the second input terminal of the second adder 8. Since the output of the buffer amplifier 5-1 is the signal $b_3$, the signal $b'_3$ (hereinafter called "proper line video signal") output by the second adder 8 is given as:

$$b'_3 = b_3 + 0.5 \times (a_3 + a_2)$$

Generally, a line video signal is expressed as follows:

$$b'_n = b_n + 0.5 \times (a_n + a_{n-1})$$

Figure 6C:
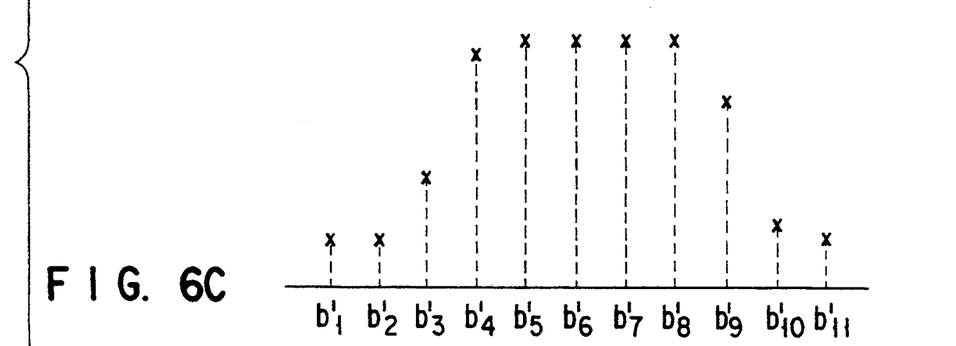

The line video signal therefore has, for the second field, the level distribution illustrated in FIG. 6C.

In the meantime, the output of the buffer amplifier 5-1, the video signal $b_3$ in this instance, is supplied to the first input terminal of the third adder 9. The output signal from the first adder 6, i.e., video signal $(a_3+a_2)$, is input to the coefficient circuit 11. The circuit 11 multiplies the input video signal with a coefficient $-\frac{1}{2}$ and produces a signal. This signal is supplied to the second input terminal of the third adder 9. The third adder 9 performs the following addition:

$$b''_3 = b_3 - 0.5 \times (a_3 + a_2)$$

This can be changed to a general equation of:

$$b''_n = b_n - 0.5 \times (a_n + a_{n-1})$$

Figure 6D:
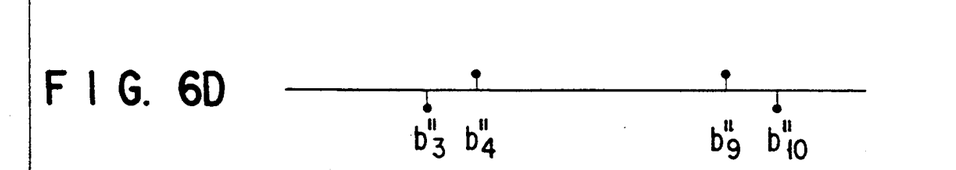
FIGS. 6D and 6E are diagrams illustrating the vertical-edge signals generated by processing the signals output by the CCD.

The signal output by the third adder 9 therefore has the level distribution shown in FIG. 6D. This signal is a vertical-edge signal for first field. As can be understood from FIGS. 2, 5A, 5B, and 5C, this vertical-edge signal has been generated from the signals $a_2$ and $a_3$ sampled at two points which are on two first-field scanning lines and which are adjacent to that point on the second-field scanning line at which the signal $b_3$ has been sampled.

The vertical-edge signal, which the third adder 9 generates in the first field or the second field, is supplied to the low-pass filter 13. The filter 13 removes the high-frequency component of the vertical-edge signal. The signal output from the filter 13 is supplied to the level adjuster 14. The level adjuster 14 adjusts the level of the signal to an appropriate value. The signal is supplied to the second input terminal of the fourth adder 15. The fourth adder 15 adds the signal to the video signal supplied to its first input terminal from the second adder 8 through the timing-adjusting delay line 12.

The purpose for which the low-pass filter 13 removes the high-frequency component of the vertical-edge signal is to improve the S/N ratio of the output signal of the fourth adder 9. This technique, which is known in the art, is not indispensable to the present invention; the low-pass filter 13 can be dispensed with. The level adjuster 14, which adjusts the level of an input signal only when necessary for the purpose later described, may be dispensed with, too.

The proper line signal and the vertical-edge signal, output from the second adder 8 and the third adder 9, respectively, are in phase with respect to each other. At the time it is input to the fourth adder 15, however, the vertical-edge signal becomes out of phase with the proper line signal since it has been processed by the low-pass filter and the level adjuster 14. (The greater part of the time by which the vertical-edge signal is delayed with respect to the proper line signal is the period the low-pass filter 13 needs to remove the high-frequency component of the signal.)

To set the vertical-edge signal into phase with the proper line signal, the vertical-edge signal is input to the adder 15 through the delay line 12. As the vertical-edge signal passes through the line 12, it is delayed by a very short time to become in phase with the proper line signal at the fourth adder 15. In the case neither the low-pass filter 13 nor the level adjuster 14 is used, the delay line 12 is unnecessary.

Figure 7:
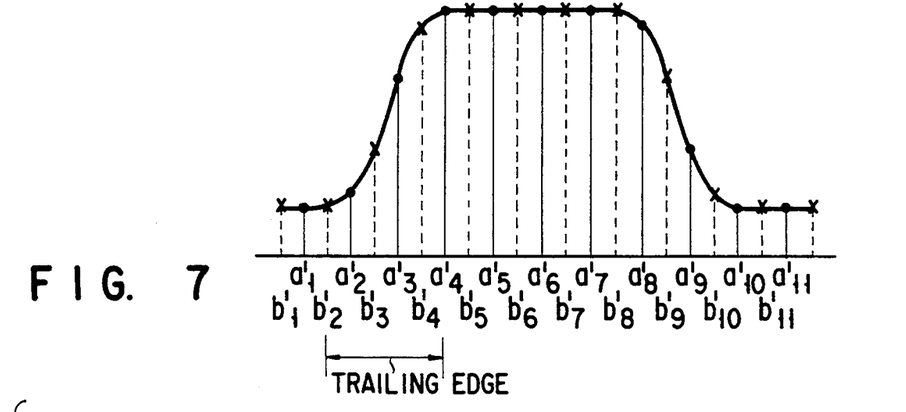
FIG. 7 is a diagram showing the video-signal level distribution obtained by interlacing the first-field and second-field video signals illustrated in FIGS. 5C and 6C, respectively.

FIG. 7 shows the video-signal level distribution which is obtained when the first-field and second-field video signals shown in FIGS. 5C and 6C, respectively, are interlaced. The level distribution pertains to the video signals sampled at the intersections of the dot-dash line and the solid and broken lines, and represents the vertical resolution of the CCD camera (FIG. 4) which can be visually recognized on a CRT screen.

The leading edge of the envelope shown in FIG. 7 extends from the sampling points $b'_2$ to $a'_4$, for a longer time than that of the envelope shown in FIG. 3C extends, from the sampling points $b'_2$ to $b'_4$. In other words, in the level distribution of FIG. 7, the leading edge lasts longer than the leading edge ($b_2$ to $b_4$) of the envelope which pertains to video signals sampled in the reading of signals of two-line-summation. Nonetheless, the video-signal level distribution shown in FIG. 7 can be corrected to the ideal one illustrated in FIG. 2, as will be explained in the following.

Figure 8A:
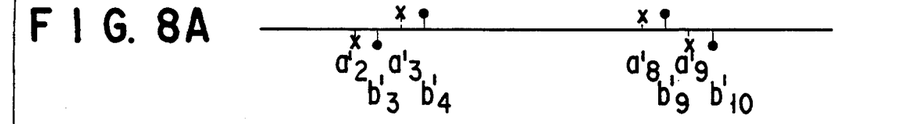
FIG. 8A is a diagram showing vertical-edge signals (FIGS. 5D and 6D) which have been interlaced.

As described above, a vertical-edge signal of the type shown in FIG. 5D is obtained in the first field, whereas a vertical-edge signal of the type shown in FIG. 6D is generated in the second field. The vertical-edge signal (FIG. 5D or FIG. 6D) output from the third adder 9 is added to the proper line signal (FIG. 5C or FIG. 6C) output from the second adder 8, in the ratio of 1:1, by means of the fourth adder 15. More precisely, in the first field, the adder 15 adds the vertical-edge signal of FIG. 5D to the proper line signal of FIG. 5C; in the second field, the adder 15 adds the vertical-edge signal of FIG. 6D to the proper line signal of FIG. 6C. Then, the signals which the adder 15 generates in the first and second fields are interpolated by interlace technique. As a result, the vertical-edge signals obtained in the first and second fields, respectively, have the levels illustrated in FIG. 8A. The vertical-edge signals shown in FIG. 8A are added to the video signals which define the level distribution of FIG. 7, converting the level distribution to a specific one illustrated in FIG. 8B.

Figure 8B:
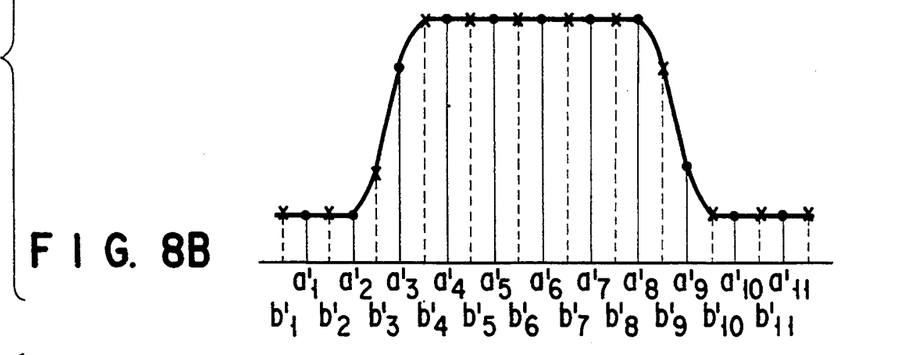
FIG. 8B is a diagram illustrating a video signal (FIG. 7) to which the vertical-edge signal (FIG. 8A) has been added.

As is evident from FIG. 8B, both the leading edge and the trailing ledge of the envelope extend over the same period as those of the envelope shown in FIG. 2. This means that the output signals of the fourth adder 15 acquires the levels substantially identical to those of the signals (3C) generated in the reading of signals of two-line-summation. Furthermore, as can be understood from FIG. 8B, the vertical resolution of the CCD camera is not decreased from the optimal value which is represented in FIG. 2.

The vertical-edge signals shown in FIGS. 5D and 6D are intra-field ones, each indicating a line on a CRT screen which has half the thickness of a line represented by a vertical-edge signal generated in the reading of signals of two-line-summation. (Reduction of the line thickness to half means a signal frequency twice as high.) Since the sensitivity of the CCD camera is increased, not by accumulating frames, but by intra-field processing, no afterimages will be formed.

Figure 5E:
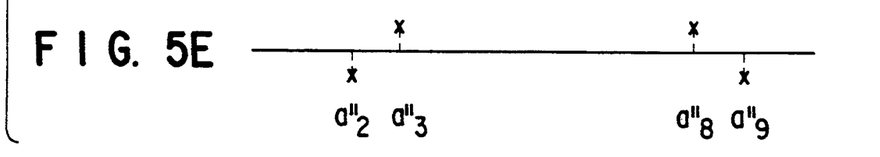
Figure 6E:
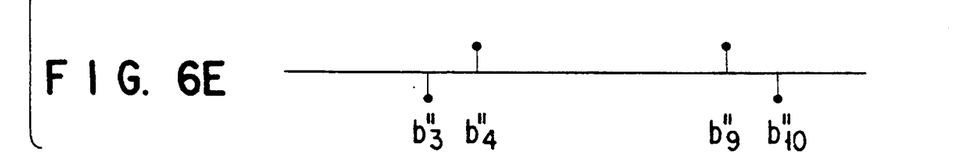

The level adjuster 14 is used in order to emphasize, if necessary, the vertical edges of a video signal. For instance, the level adjuster 14 increases the levels of the first-field vertical-edge signal shown in FIG. 5D twice as high, thus generating a vertical-edge signal shown in FIG. 5E, and the level adjuster 14 increases the levels of the second-field vertical-edge signal shown in FIG. 6D twice as high, thus generating a vertical-edge signal shown in FIG. 6E. The fourth adder 15 adds the signal of FIG. 5E to the proper line signal shown in FIG. 5C, generating a first-field signal, and the signal of FIG. 6E to the proper line signal shown in FIG. 6C, producing a second-field signal. Then, the first-field signal and the second-field signal are interpolated by interlace technique. The signals obtained by the interlace technique have the level distribution shown in 9B. As can be clearly seen from FIG. 8B, these are video signals having their vertical edges more emphasized than those of the video signals shown in FIG. 2.

In the present invention, as has been described, an intra-field vertical-edge signal can be generated from signals sampled at two points which are on two scanning lines of odd- or even-numbered fields and which are adjacent to that point on a scanning line of an even- or odd-numbered field where a reference signal has been sampled. The intra-field vertical-edge signal has its frequency increased as twice as a vertical-edge signal generated in the reading of signals of two-line-summation.

The driving of the shutter of the CCD camera does not involve at all in the process of generating the intra-field vertical-edge signal, unlike in the method disclosed in Jpn. Pat. Appln. KOKAI Publication No. 63-209280. The CCD camera of this invention is therefore advantageous in the following respects:

(1) The sensitivity does not decrease even if the vertical resolution is adjusted (or, even if the level of the vertical-edge signal is raised by the level adjuster 14).

(2) The vertical resolution can be improved even if the shutter is driven such that the period for which any two adjacent pixels for an odd-numbered line accumulate charges and the period for which any two adjacent pixels for an even-numbered line are accumulates charges are altered in every field. This is because the driving of the shutter is not at all involved here in the processing of signals to increase the vertical resolution.

(3) No light and dark stripes will appear in a rephotographed image which the the CCD camera provides taking a TV-screen image displayed by a TV receiver synchronous with the camera. This is because the shutter is not driven, whereas stripes will appear in the image if the CCD shutter is driven.

(4) An image formed by the CCD camera is free of flicker even if the object has illuminated with light from a 50 Hz fluorescent lamp light. This is because the shutter is driven at the frequency of 100 Hz, irrespective of the processing of signals to increase the vertical resolution.

The CCD camera shown in FIG. 4 can, despite its relatively simple structure, process signals to attain the object of the invention disclosed in Jpn. Pat. Appln. KOKAI Publication No. 2-31912, the object being to improve vertical resolution. Moreover, the CCD camera does not produce afterimages since each vertical-edge signal is generated from the charge the CCD 1 accumulates for one field, not from charges the CCD 1 accumulates for two fields.

In the conventional method of processing signals without reducing the sensitivity in reading of signals of one line, charges must be accumulated in units of frames, not in units of fields—inevitably forming afterimages, deteriorating quality of moving pictures. By contrast, the CCD camera has its vertical resolution improved, without performing frame-accumulation of charges.

Figure 9A:
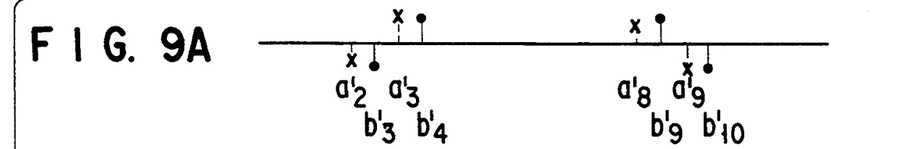
FIG. 9A is a diagram showing a signal obtained by interlacing the vertical-edge signals shown in FIGS. 5A and 6E.
Figure 9B:
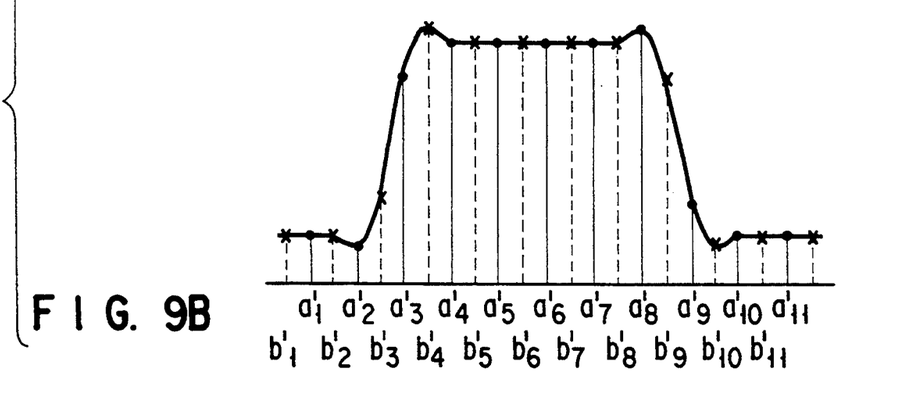
FIG. 9B is a diagram showing a signal obtained by adding the vertical-edge signal of FIG. 9A to the video signal of FIG. 7.

Unlike conventional methods of improving the vertical resolution of a CCD camera without causing an after image, such as the one disclosed in Jpn. Pat. Appln. KOKAI Publication No. 63-209280, wherein charges must be accumulated in units of frames, the present invention can emphasize the vertical edges of video signals as is illustrated in FIG. 9B. This helps to further improve the vertical resolution of the CCD camera.

The present invention is not limited to the embodiment described above. For instance, the switching circuit 4 may be incorporated into the CCD 1. Even if incorporated in the CCD 1, the circuit 4 will perform its function in the same way. Moreover, the switching circuit 4 may switches the combination of read scanning lines for each field in accordance with the pulses for driving the CCD 1, not in accordance with the field ID signal supplied from the CCD drive circuit 2.

Further, the 1H-DL circuit 7, the first adder 6, and the coefficient circuits 10 and 11 may be incorporated into the CCD1. Still further, instead of processing the analog signals output from the CCD1, these analog signals may first be converted into digital ones, and the digital signals may be processed to attain the same results.

As has been described, the proper line video signal for the first field, which is obtained by the second adder 8, is expressed in the general equation of:

$$a'_n = a_n + 0.5 \times (b_n + b_{n+1})$$

This equation can be changed to:

$$a'_n = K_1 \times a_n + K_2 \times (b_n + b_{n+1})$$

where $K_1 + K_2 \times 2 = K_3$.

Then, if $K_1 = 2$, the sensitivity of the CCD camera does not differ from the value attained in the reading of signals of two-line-summation. The more the value for $K_1$ is decreased from 2, the lower the sensitivity. If $K_1 = 1$ and $K_2 < 0.5$, then the leading and trailing edges of the video-signal level distribution shown in FIG. 7 will approximate those of an original signal (corresponding to the signal shown FIG. 2) to enhance the vertical resolution. In this case, however, the sensitivity will decrease. If $K_1 = 1$ and $K_2 = 0$ (the least value possible), the sensitivity will become the same as in the reading of signals of one line, and the CCD camera will produce a signal identical to the original signal. In this case, however, the sensitivity will decrease to 50% of the sensitivity acquired in the reading of signals of two-line-summation.

Further, if $K_1=1$ and $K_2>0.5$, then the sensitivity will increase. If $K_1=1$ and $K_2=1$ (the greatest value possible), the sensitivity will become the same as in the reading of signals of three lines, and the original signal will be deteriorated in terms of vertical resolution.

$K_1$, $K_2$, and $K_3$ must be set in accordance with the gains of the adders and the buffer amplifier, at such values as would achieve the above-mentioned advantage of coefficient multiplication. The vertical resolution of the CCD camera of the invention can be controlled not only by adjusting the vertical-edge signal by means of the level adjuster 14, but also by changing $K_1$, $K_2$, and $K_3$ may be changed, if necessary.

The buffer amplifiers 5-1 and 5-2 may be replaced by those whose gains can be controlled. In this case, the gains of the two video signals output from the CCD 1 can be adjusted, thereby to render the present invention more advantageous.

The CCD 1, which is an integrated type, may be replaced by a single-plate CCD having a plurality of light-receiving elements and a plurality of three-color filters provided for the respective light-receiving elements, or by three CCDs for forming three different color images, respectively.

The television camera apparatus according to the invention is not limited to an NTSC system one. The present invention can be applied to any television camera which has a component capable of interlacing the first-field signal and the second-field signal. Neither is the apparatus limited to one having a CCD. It can be a television camera apparatus which has any other solid-state imaging device.

As has been described above, in the present invention, video signals are read from the CCD in reading a signal of one line in each field, a video signal read from a scanning line of a field is combined with two video signals read from two scanning lines of the fields preceding and following that field, thereby generating a vertical-edge signal, and the vertical-edge signal is combined with the video signal read from the scanning line for that field. Hence, the television camera apparatus of this invention can maintain its high sensitivity and can has its vertical resolution enhanced without shutter driving.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A television camera comprising:
    a solid state imaging device for reading video signals from vertical and horizontal scanning lines;
    a driving device for driving the solid state imaging device to read said video signals corresponding to a first field, defined by a vertical scanning line of pixels intersecting odd numbered horizontal lines starting with a first odd numbered horizontal line ($a_1, a_2 \ldots a_{n-1}, a_n$) and intersecting even numbered horizontal lines starting with a second even numbered horizontal line ($b_2, b_3 \ldots b_{n-1}, b_n$);
    said driving device for driving the solid state imaging device to read said video signals corresponding to a second field after reading said first field, said second field defined by a vertical scanning line of pixels intersecting said odd numbered horizontal lines starting with said first odd numbered horizontal line ($a_1, a_2 \ldots a_{n-1}, a_n$) and intersecting said even numbered horizontal lines starting with a first even numbered horizontal line ($b_1, b_2 \ldots b_{n-1}, b_n$);
    a switching circuit receiving said video signals from the solid state imaging device corresponding to the odd numbered horizontal lines and the even numbered horizontal lines, for outputting the video signals corresponding to the odd numbered horizontal lines and the even numbered horizontal lines from a first and second outputs of the switching circuit, respectively, when the solid state imaging device reads said video signals of the first field, and for switching the first and second outputs of the switching circuit when the solid state imaging device reads the second field;
    a one horizontal line delay device for delaying an output signal of the second output of the switching circuit by one horizontal line;
    a first adder for adding the output signal of the second output of the switching circuit to an output of the one horizontal line delay device;
    a first multiplier for multiplying an output signal of the first adder by a first coefficient (K1) for adjusting sensitivity and resolution of the television camera;
    a second multiplier for multiplying the output signal of the first adder by a second coefficient (K2) for adjusting the sensitivity and resolution of the television camera;
    a second adder adding an output signal from the first output of the switching circuit with an output signal of the first multiplier, an output signal from the second adder representing a distribution of the first field and the second field;
    a third adder adding an output signal from the first output of the switching circuit with an output signal from the second multiplier, an output signal of the third adder representing a vertical-edge signal including both positive and negative components; and
    a fourth adder adding the vertical-edge signal corresponding to the first field and the second field to correct vertical-edge resolution in each field before interlacing the first and second fields.

2. The apparatus according to claim 1, wherein the first coefficient (K1) is set to 0.5 and the second coefficient is set to $-0.5$ for optimum sensitivity and resolution.

3. The apparatus according to claim 2, further comprising:
    a low-pass filter receiving the output signal of the third adder for filtering out high frequency noise components from the vertical-edge signal;
    a level adjuster for adjusting the voltage level of the vertical-edge signal after being fed through the low-pass filter, and for outputting the vertical-edge signal to the fourth adder; and
    a delay line for delaying the output signal of the second adder and for matching the phase of the distribution of the first field and the second field with the vertical-edge signal after being fed through the low-pass filter and the level adjuster.

4. The apparatus according to claim 3, wherein the solid state imaging device is a charge coupled device (CCD).

5. The apparatus according to claim 4, further comprising:
    buffers buffering the video signals outputted from the solid state imaging device and buffering the output signals from the first output and the second output of the circuit switching device.

* * * * *